Figure 1:
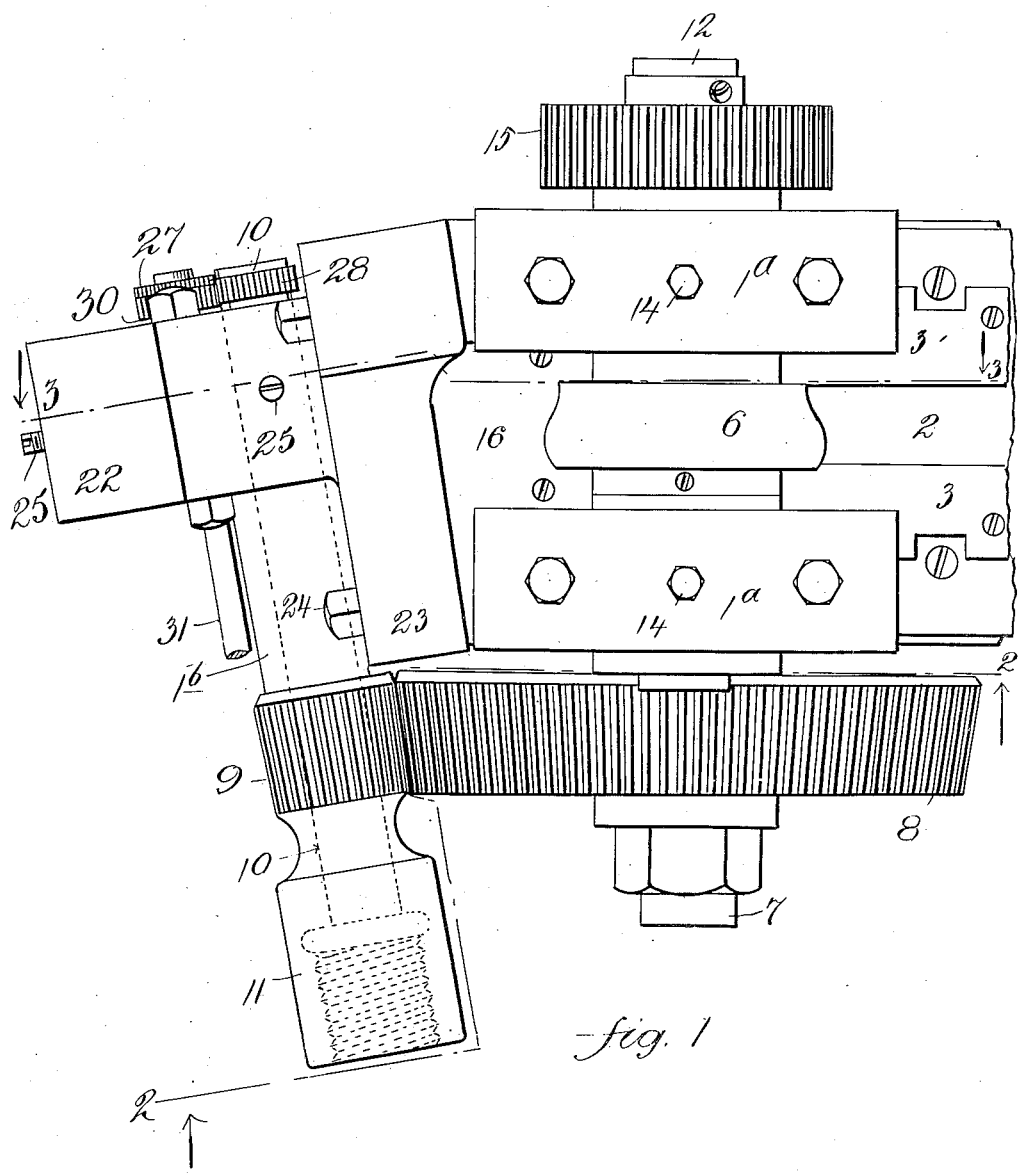

G. A. LUTZ.
METHOD OF MAKING ARMORED ELECTRICAL CONDUCTORS.
APPLICATION FILED MAR. 23, 1909.

969,712.

Patented Sept. 6, 1910.

5 SHEETS—SHEET 1.

Witnesses:

Inventor
George A. Lutz,
By his Attorney
T. F. Bourne

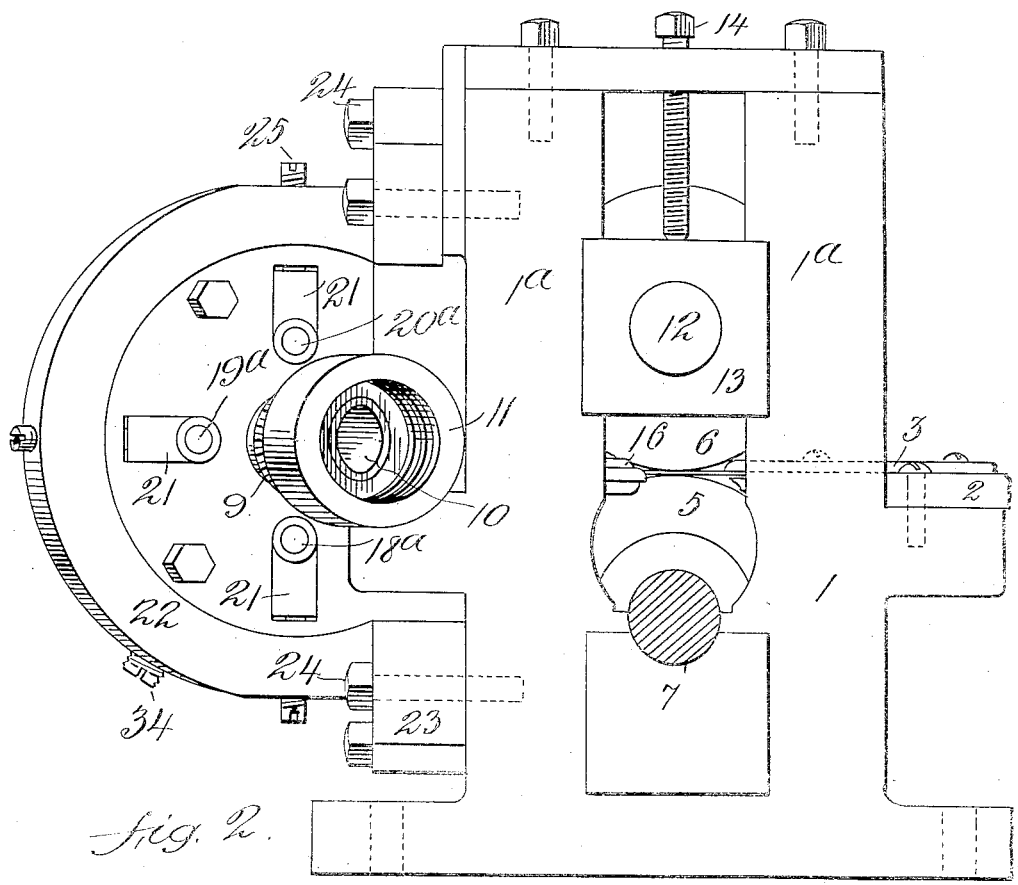

G. A. LUTZ.
METHOD OF MAKING ARMORED ELECTRICAL CONDUCTORS.
APPLICATION FILED MAR. 23, 1909.
969,712.
Patented Sept. 6, 1910.
5 SHEETS—SHEET 3.
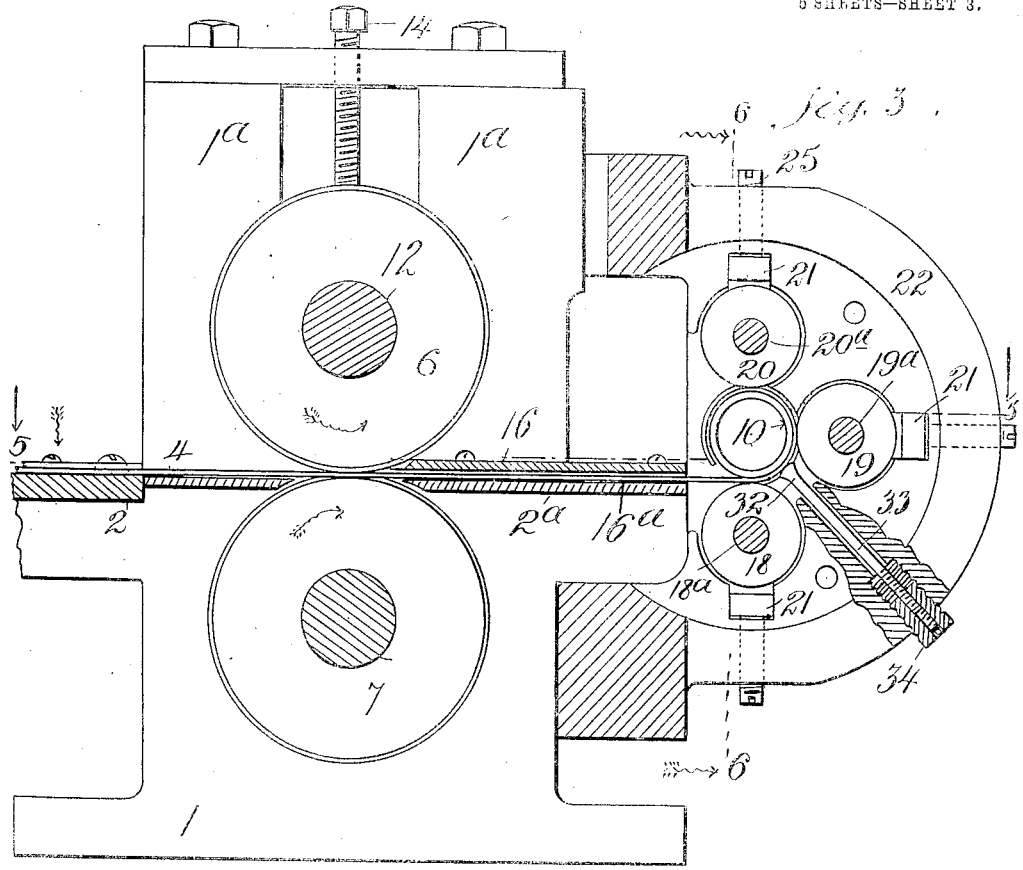
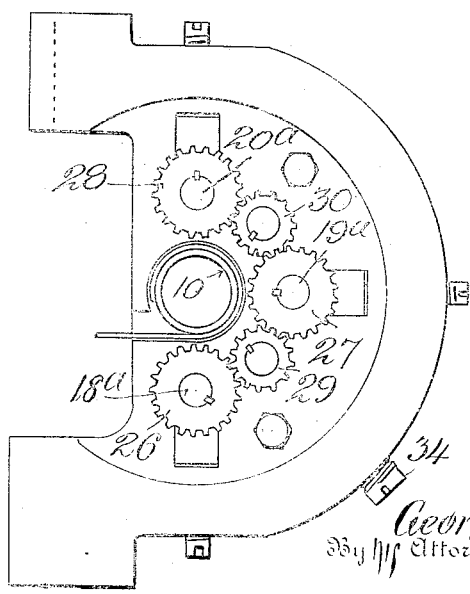
fig. 4.
Witnesses:
Inventor
George A. Lutz.
By his Attorney
T. F. Bourne G. A. LUTZ.
METHOD OF MAKING ARMORED ELECTRICAL CONDUCTORS.
APPLICATION FILED MAR. 23, 1909.
969,712.
Patented Sept. 6, 1910.
5 SHEETS—SHEET 4.
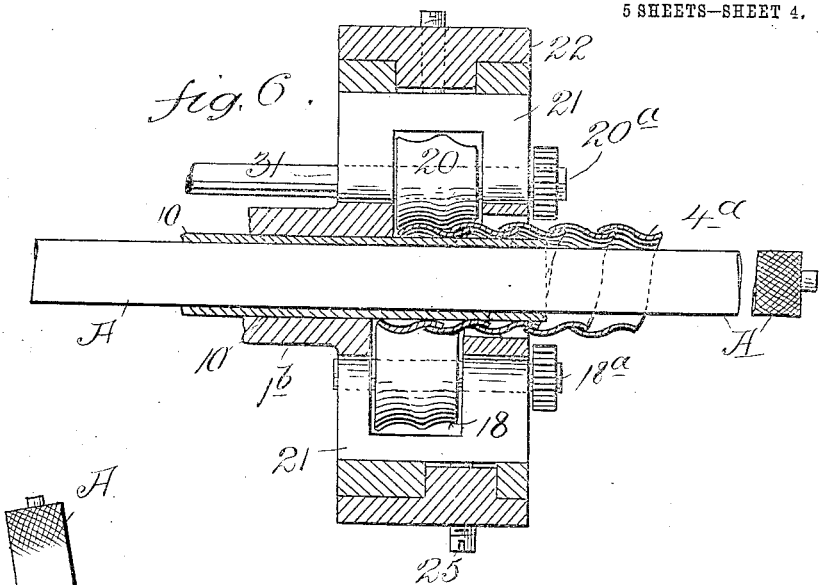
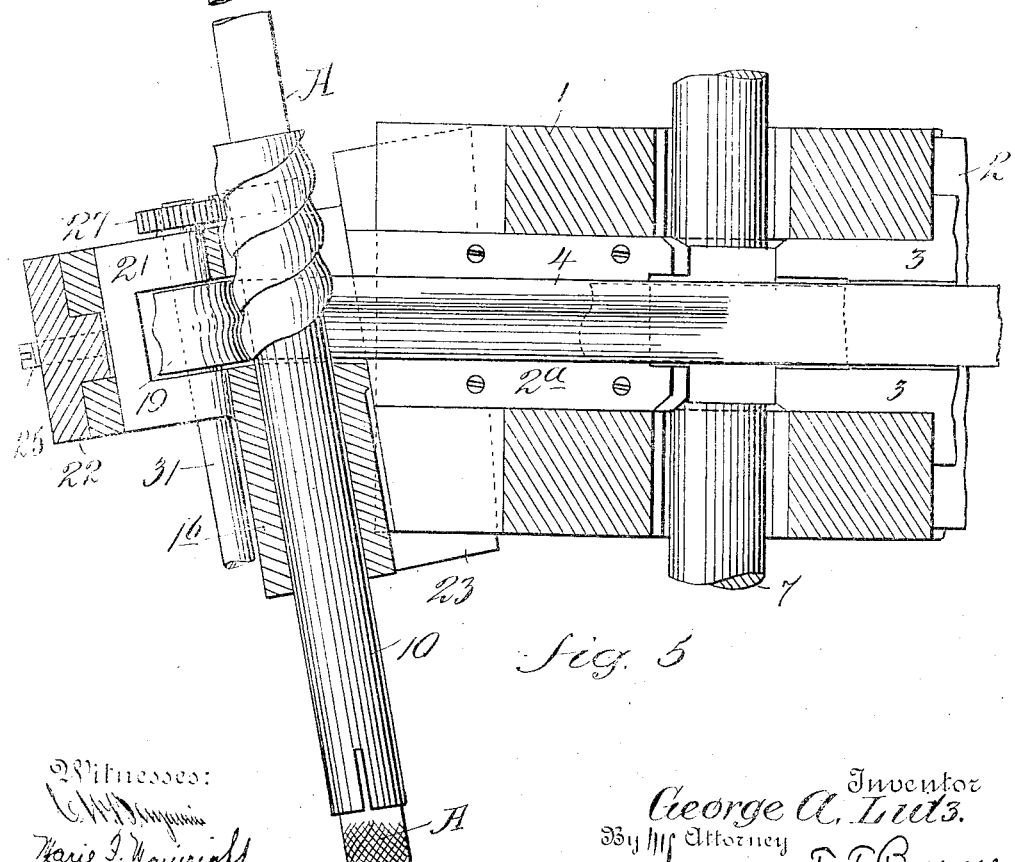
Witnesses:
Inventor
George A. Lutz
By his Attorney
T. F. Bourne G. A. LUTZ.
METHOD OF MAKING ARMORED ELECTRICAL CONDUCTORS.
APPLICATION FILED MAR. 23, 1909.

969,712.

Patented Sept. 6, 1910.
5 SHEETS—SHEET 5.

Witnesses:

Inventor
George A. Lutz
By his Attorney
P. F. Bourne

UNITED STATES PATENT OFFICE.

GEORGE A. LUTZ, OF PLAINFIELD, NEW JERSEY, ASSIGNOR TO AMERICAN CIRCULAR LOOM COMPANY, OF PORTLAND, MAINE, A CORPORATION OF MAINE.

METHOD OF MAKING ARMORED ELECTRICAL CONDUCTORS.

969,712. Specification of Letters Patent. Patented Sept. 6, 1910.

Application filed March 23, 1909. Serial No. 485,263.

*To all whom it may concern:*

Be it known that I, GEORGE A. LUTZ, a citizen of the United States, and resident of Plainfield, in the county of Union and State of New Jersey, have invented certain new and useful Improvements in Methods of Making Armored Electrical Conductors, of which the following is a specification.

The object of my invention is to produce armored electrical conductors which shall be strong and flexible and relatively cheap to manufacture.

In carrying out my invention I produce a flexible armor or cover for a conductor which is of larger internal diameter than the external diameter of the insulation of the conductor received within said cover, and then I reduce the diameter of the cover while the conductor is within the same, whereby the cover will fit snugly upon the insulation. To these ends I wind a strip of suitable material, such as metal, in spiral form around the insulated conductor, as by passing such conductor through a hollow mandrel while the strip is being spirally wound upon the mandrel, whereby the internal diameter of the spirally wound strip or cover is greater than the external diameter of the insulation of the conductor, but the spirally wound cover is preferably not so long as the conductor received within the same, and then the diameter of the cover is reduced, as by running the same with the contained conductor through suitable rolls or dies which, while reducing the diameter of the cover and pressing the same upon the insulation of the conductor simultaneously elongate or lengthen the cover, which may to an extent substantially correspond to the previously uncovered portion of the conductor. By this means I am enabled to carry out my invention by the use of rolls for forming the cover and applying the same firmly and snugly upon the insulation of the conductor, and the armor may thus be made directly at a relatively low cost upon the insulated conductor in relatively long lengths without requiring the conductor to be drawn through the cover after the latter is made.

Figure 8:
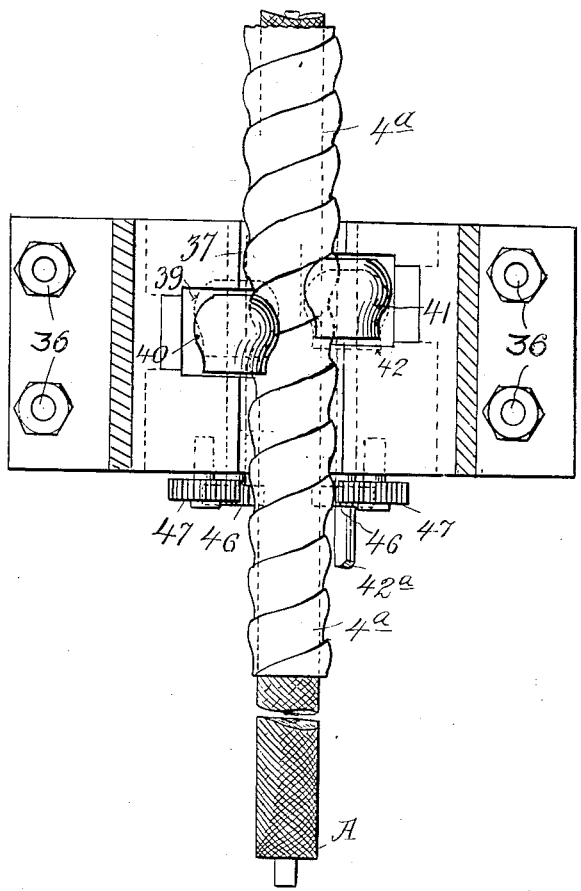
Figure 7:
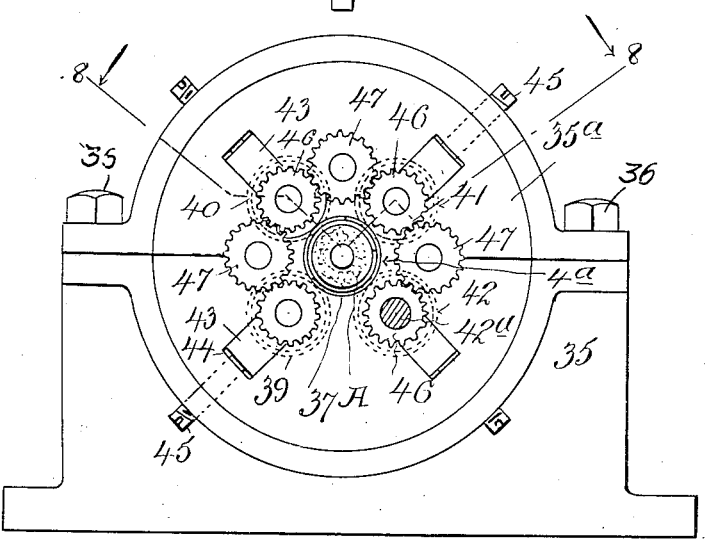

In the accompanying drawings I have illustrated mechanism adapted for carrying out my invention, wherein, Figure 1 is a plan view of a portion of a machine adapted to form the spiral cover around an insulated conductor, Fig. 2 is a side view thereof partly in section on the line 2, 2, in Fig. 1, Fig. 3 is a vertical longitudinal section substantially on the line 3, 3, in Fig. 1, looking in the direction of the arrows, showing a strip in position to be wound, Fig. 4 is a detail view of part of the machine at the right hand side in Fig. 3, showing gearing for operating the bending or winding rolls, Fig. 5 is a horizontal section substantially on the line 5, 5, in Fig. 3, Fig. 6 is a vertical section substantially on the line 6, 6, in Fig. 3, looking in the direction of the arrows, Fig. 7 is an end elevation of devices for compressing the spirally wound cover upon its contained insulated conductor, and Fig. 8 is a horizontal section substantially on the line 8, 8, in Fig. 7.

Similar numerals of reference indicate corresponding parts in the several views.

In the drawings the numeral 1 indicates a suitable frame, having a table or the like 2 upon which are located guides 3, having a space between them in which the strip 4 to be wound is adapted to pass. In the illustration I have shown rollers 5, 6, between which strip 4 is to pass and the peripheries of said rollers are suitably curved or shaped to produce the desired shape of the strip. I have shown in Fig. 6 strip 4 as having longitudinally disposed concavo-convex grooves, and rollers 5, 6, are correspondingly shaped to produce such longitudinal groove-like parts in strip 4, although the shape of the strip may be varied in accordance with the requirements. The arrangement is such that when strip 4 is wound in spiral form the grooved or bent longitudinal portion at one edge of the strip will mesh with the grooved or bent marginal portion of the other edge of the strip whereby the tube thus produced is flexible. Roller 5 is suitably journaled in frame 1 and its shaft 7 is shown provided with a gear 8 that meshes with a driving pinion 9 carried by a hollow mandrel or shaft 10 which may be provided with a coupling 11 for connection with any suitable driving means, or shaft 7 may be directly rotated if desired and in turn rotate mandrel 10. Roller 6 is preferably carried in boxes 13 shown guided between the upright parts 1ª, of frame 1, screws 14 being provided to act upon said boxes to force roller 6 against strip 4 to grip the latter between rollers 5, 6 to any desired extent, whereby when the rollers rotate, as shown by the arrows in Fig. 3, the strip will be grooved and fed forwardly. The shafts 7 and 12 may be geared together, as by gearing 15, to cause rollers 5, 6, to rotate at the same peripheral speed. 16 indicates a guide or plate located over bed 2ª providing a channel 16ª having its inner end adjacent to the periphery of roller 5 and suitably shaped whereby a guiding channel is provided for the grooved strip 4 as it passes from between rollers 5, 6, so that the strip may travel on a straight line therefrom to the bending device. The above described parts provide convenient means for simultaneously grooving and feeding strip 4 which may be fed in continuous lengths from a roll or other supply.

The grooved strip 4 as it passes from rollers 5, 6, travels to the hollow mandrel 10 around which mandrel said strip is to be wound in spiral form, so that its grooves or depressions will lap or interlock in the manner before described, simultaneously with the passage through said mandrel of an insulated conductor A (see Fig. 6), so that as strip 4 is wound in tubular form around mandrel 10 it is fed forwardly equally with the feeding of conductor A through mandrel 10, any suitable means being provided for so feeding said conductor. Mandrel 10 is rotated in suitable bearings 1ᵇ of frame 1 and is located at the proper angle with respect to the axis of shaft 7, to accord with the pitch of the spiral of the wound cover, which in turn accords with the shape of the longitudinal grooves and depressions of strip 4. To effect such winding of strip 4 around mandrel 10 I provide a series of bending or winding surfaces or rolls 18, 19, 20, whose working edges or peripheries are located substantially spirally circumferentially around the axis of mandrel 10, as indicated in Fig. 6, the arangement being such that such spiral line advances from the lower roller 18 to the rollers 19, and 20 toward the righthand side in Fig. 6. As shown, rolls 18, 19, 20, have surfaces suitably shaped to substantially correspond with the contour of the longitudinal grooves and depressions of strip 4 as the latter is wound and lapped. Said rolls may be mounted to rotate in any suitable manner, but for convenience I have shown their spindles or gudgeons 18ª, 19ª, 20ª, as provided with blocks or bearings 21 which are located in recesses in a support or frame 22. Support or frame 22 is shown provided with flanges 23 secured to frame 1 by screws 24. Support or frame 22 is suitably shaped interiorly to receive mandrel 10 and the winding rolls (see Fig. 3). 25 indicates screws meshing in threaded apertures in support or frame 22 and bearing upon blocks or bearings 21, whereby the latter may be adjusted toward and from the mandrel to permit adjustment of rolls 18, 19 and 20 toward and from said mandrel, and to provide for winding or coiling strips 4 of varying thicknesses, the surface of said rolls being such as to create proper pressure upon the intermediate and the lapping portions of the spiral winding. Rolls 18, 19, 20 are geared together to all rotate in the same direction and at the same surface speed, as indicated in Fig. 4, wherein said rolls are respectively provided with gears 26, 27, 28 of equal diameter, gears 26, 27 meshing with a pinion or idler 29 and gears 27, 28 meshing with a pinion or idler 30. Either one of said rolls or gears may be connected with any suitable means for positively driving the train of gearing, as by shaft 31.

To cause strip 4 to be positively guided around mandrel 10 when the end of the strip is first presented to the winding or bending rolls I have shown in Fig. 3 an abutment 32 in the form of a plug or stem located between rolls 18, 19 and adapted to be pushed or placed in the path of said strip by means of a screw rod 33 guided in frame or support 22 and shown controlled by a screw 34 meshing in a threaded aperture in said frame. The abutment may be adjusted to accommodate strips of varying thicknesses, and if desired after the end of the strip has been guided around mandrel 10 the abutment may be drawn back until a new strip is to be inserted. By having the mandrel 10 located at an angle to the axis of shaft 7 and rolls 18, 19 and 20 corresponding to such angle, which may be done by connecting frame 22 to frame 1 at a corresponding angle, as strip 4 advances to the mandrel and passes around the outer side of the same the rolls 18, 19 and 20 will not only cause the strip to be wound spirally around the mandrel 1 but assist in advancing the tube thus wound along the mandrel.

The insulating conductor A being fed through mandrel 10 at the same speed as the travel of the spirally wound tube 4ª along the exterior of the mandrel is continued until as great a length as desired of such tube is wound on the conductor, such length of the spirally wound tube being determined approximately for the length of armored conductor desired by the approximate amount that the spirally wound tube will lengthen or elongate when compressed snugly upon the conductor, that is to say, if the conductor to be covered should be 300 feet long, then the spirally wound tube or cover placed thereon in the manner described will be as much shorter than 300 feet as substantially equals the difference between the then length of the spiral tube and the length it will be when compressed and thus lengthened or elongated, by which means such conductor may be covered throughout its entire length by the spirally wound tube or cover without material loss in the length of the corresponding cover and conductor.

While any suitable means may be provided for compressing the spirally wound tube upon conductor A, and thereby simultaneously elongating such tube, I have shown in Figs. 7 and 8 suitable means for the purpose arranged as follows:—Head or block 35 is supported in a suitable manner and is shown provided with a movable cap portion 35ª held in place by screws 36, a longitudinally disposed opening 37 being provided for the passage of conductor A with its surrounding protecting tubular cover 4ª. The head or block 35 is provided with means for compressing and feeding forwardly the tube 4ª and the conductor, the means shown comprising a plurality of spirally disposed rolls having their peripheries shaped to properly accord with the surface shape of cover 4ª. I have shown four such rolls 39, 40, 41, 42, although any suitable number may be provided. The shafts of said rolls are shown carried by suitable boxes or bearings 43 guided in radially disposed openings 44 in said heads, screws 45 meshing in threaded apertures in said head and acting upon said boxes serving to press the rolls against tube 4ª with the required pressure. Said rolls are adapted to be positively rotated in the same direction and at the same surface speed, for which purpose the shafts of said rolls are provided with gears 46 meshing with idle gears 47 suitably journaled upon head 35, one of the shafts, as the shaft 42ª of gear 42 being operated as the driving shaft. With the arrangement shown, the conductor A with its surrounding tubular cover 4ª is passed into or through opening 37, and rolls 39, 40, 41 and 42 are adjusted to proper pressure to squeeze tube 4ª snugly, or to the amount desired, around and upon conductor A, and said rolls are then rotated whereby tube 4ª is decreased in diameter and simultaneously the material of tube 4ª is elongated commensurate with the reduction of its diameter and travels along conductor A in a direction opposite to that of the travel of the tube and conductor through head 35 until tube 4ª is compressed throughout its length upon the conductor. By first determining the amount of final elongation of tube 4ª and winding the approximate amount of strip 4 upon a given length of conductor A and starting to compress the tube approximately at one end of the contained conductor, the opposite ends of the conductor and covering of the completed armored conductor will be approximately even so that there will be little if any waste in material.

It will be understood that it is not necessary according to my invention to draw the metal of tube 4ª to reduce or compress it upon the conductor, and thereby the original thickness and condition of the strip of which tube 4ª is formed is substantially preserved, and the spiral winding is maintained in uniform condition as the peripheries of rolls 39, 40, 41 and 42 may accord with the peripheries of rolls 18, 19 and 20.

Any suitable or wellknown means may be utilized for drawing or aiding in drawing the armored conductor A through the head 35.

Having now described my invention what I claim is:—

1. The method of making armored conductors consisting in inclosing a conductor within a spirally wound cover of greater internal diameter than the conductor, and compressing and reducing the diameter of said cover around said conductor.

2. The method of making armored conductors consisting in inclosing a conductor within a spirally wound cover, and compressing and simultaneously elongating said cover while upon the conductor.

3. The method of making armored conductors consisting in inclosing a conductor within a spirally wound cover, and passing the conductor and its cover simultaneously and at equal speed through compressing devices reducing the diameter of the cover and elongating the same simultaneously.

4. The method of making an armored conductor, consisting in loosely winding a spiral strip around a conductor of less diameter than the internal diameter of the tube thus formed, and then compressing said tube upon such conductor.

5. The method of making an armored conductor consisting in winding a spiral strip around a conductor of less diameter than the internal diameter of the tube thus formed, and then compressing said tube upon and simultaneously elongating it upon said conductor.

Signed at New York city, in the county of New York, and State of New York, this 17th day of March, A. D. 1909.

GEORGE A. LUTZ.

Witnesses:
T. F. BOURNE,
RALPH H. RAPHAEL.